W. H. Towers,
Flour Sieve.
Nº 54,444. Patented May 1, 1866.

Witnesses
J. L. Newton
E. R. Drake

Inventor:
Wm H. Towers

UNITED STATES PATENT OFFICE.

WILLIAM H. TOWERS, OF NEW YORK, N. Y.

IMPROVED FLOUR-BARREL.

Specification forming part of Letters Patent No. 54,444, dated May 1, 1866; antedated April 21, 1866.

*To all whom it may concern:*

Be it known that I, WILLIAM H. TOWERS, of the city, county, and State of New York, have invented a new and Improved Flour-Barrel; and I do hereby declare that the following is a full and exact description thereof, reference being had to the accompanying drawings, and the letters of reference marked thereon, making a part of this specification, of which—

Figure 2:
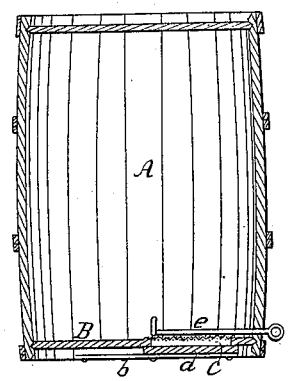
Figure 3:
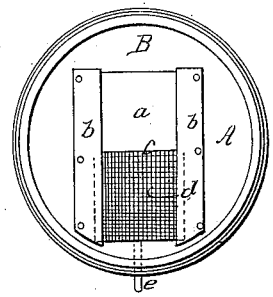
Figure 1:
Figure 4:
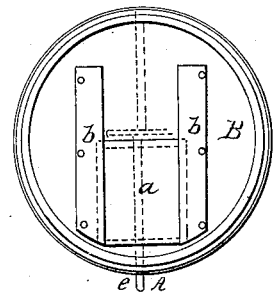

Figure 1 is a side view of the barrel; Fig. 2, a vertical section of same; Figs. 3 and 4, bottom views of same.

A represents the barrel; B, the bottom; *a*, the sliding cover; *b*, the sliding ways or guides; *c*, the sieve-opening; *d*, the sieve; *e*, the agitator or sifter.

To enable others skilled in the art to make and use my invention, I will proceed to describe its nature and operation.

The nature of my invention consists in introducing into the construction of the flour-barrel a sifter, so that when the flour is taken therefrom it will be ready for use.

In the accompanying drawings, Fig. 1 gives a simple view of a flour-barrel. Figs. 2, 3, and 4 show exactly the arrangement of my improvement.

I make my flour-barrel in the ordinary way, except in one end I cut out a part of one of the head-pieces, as represented in Figs. 3 and 4. Over this opening, in the inside of the barrel-head, I fasten or nail on a strip of wire-gauze of the ordinary fineness of ordinary flour-sieves. On the outside of the barrel-head, and over this opening, I make a sliding cover, (marked *a* in the drawings,) and this cover is fastened in and runs in the sliding ways or guides *b*, and the cover and guides may be made of wood or metallic substance. I also insert in the barrel, just above the sieve, an agitator, *e*, which may be made of a piece of stiff wire or of wood, or any material to effect the intended purpose, which is to stir the flour as it lies hard and packed in the barrel over the sieve and causing it to fall through the sieve. I then make and fill my flour-barrel in the ordinary way, except with these described additions, with the sliding cover over the sieve, which may be fastened by a nail or peg in transporting the barrel.

To use it just raise the barrel, with the sieve-head downward, on two blocks, or on an open form or stool standing on legs sufficiently high to put underneath the flour-pan; open the sliding cover and the flour will fall down through the sieve sifted and ready for use.

As flour is packed in the barrel, instead of shaking or jarring the barrel, I use the described agitator *e*, and the flour will constantly crowd down or fall on the sieve so long as there remains any in the barrel. I then have a flour-sifter made in every barrel.

The slight deviation in making my improvement in the barrel from the ordinary barrel costs but a trifle, and its advantage is readily perceived. By knocking out the barrel-head, as is the usual mode in opening to take out the flour, the barrel is broken and injured. It is always open to dirt falling in, unless there is a tight cover made expressly for the barrel. In my invention the sifter is always ready, and there is no transferring of flour to the ordinary sifter or sieve, which necessarily causes more or less dirt. Instead of placing the sieve in the head of the barrel it might be placed in one of the staves on the side of the barrel.

My invention is simple, cheap, and effective; and

What I claim as my invention, and desire to secure by Letters Patent, is—

A flour-barrel provided with a sieve, agitator, and sliding cover, arranged and operated substantially in the manner and for the purpose above set forth.

WM. H. TOWERS.

Witnesses:
J. L. NEWTON,
E. R. DRAKE.